Nov. 16, 1954

H. L. WATERMAN 2,694,283

PLATFORM COUNTERBALANCING MECHANISM

Filed June 24, 1950

Inventor:
Howard L. Waterman
By: Paul O. Pippel
Atty.

United States Patent Office 2,694,283
Patented Nov. 16, 1954

2,694,283

PLATFORM COUNTERBALANCING MECHANISM

Howard L. Waterman, Moline, Ill., assignor to International Harvester Company, a corporation of New Jersey Application June 24, 1950, Serial No. 170,086

5 Claims. (Cl. 56—208)

This invention relates to a new and improved platform counter-balancing mechanism for use in conjunction with agricultural implements such as harvester threshers.

Harvesting machines and in particular harvester threshers employ platforms for the purpose of harvesting grain or other material and elevating that material to a separator or other material treating device. The device of this invention is particularly concerned with platforms commonly known as the scoop-shovel type in which the platform is hinged at its rear at a relatively high location on the supporting structure. Thus manual raising of the platform with its harvesting appurtenances requires considerable strength without suitable counter-balancing means.

An important object of this invention is to provide a scoop shovel type of platform for harvesters in which the platform is counter-balanced.

Another important object of this invention is the provision of means in a platform counter-balancing mechanism for effortlessly raising and lowering the platform and maintaining the platform in adjusted position.

A further important object of this invention is to supply a counter-balancing mechanism for platforms of harvesters in which spring means is employed to balance the major portion of the platform weight and is associated with linkage wherein the sum of the mechanical forces of the linkage and the spring remains substantially constant throughout the various adjusted levels of the platform.

Another and still further important object of this invention is to provide toggle link means on opposite sides of a harvester platform joined by a torque resisting member whereby the platform may be raised and lowered uniformly throughout its full width.

Other and further important objects of this invention will become apparent from the disclosures in the following specification and accompanying drawing.

Figure 1:
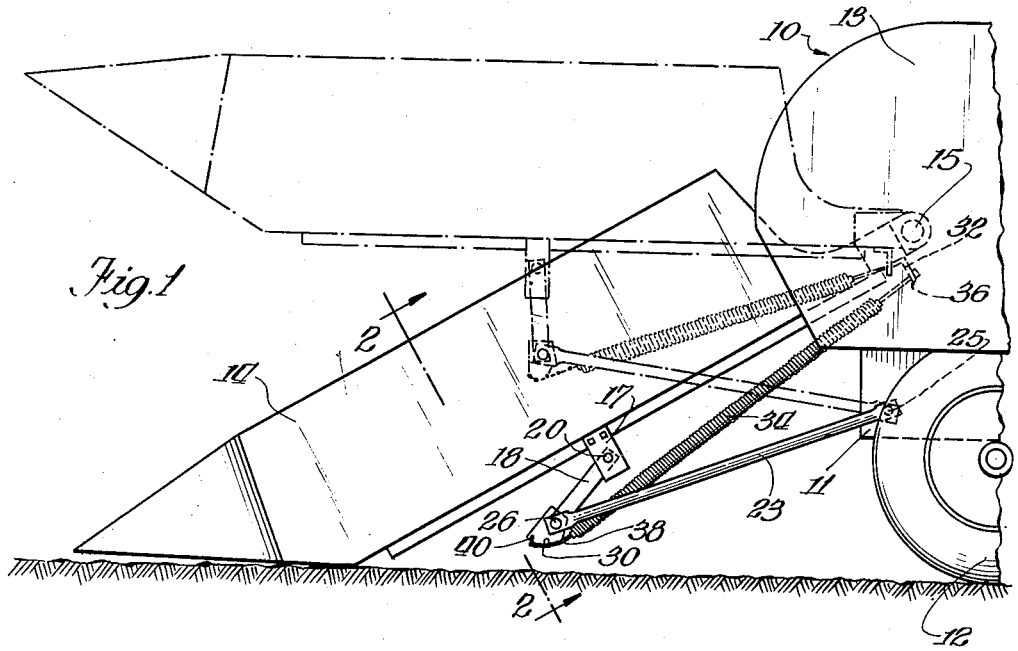
Fig. 1 is a side elevational view of a harvester thresher employing the device of this invention.
Figure 2:
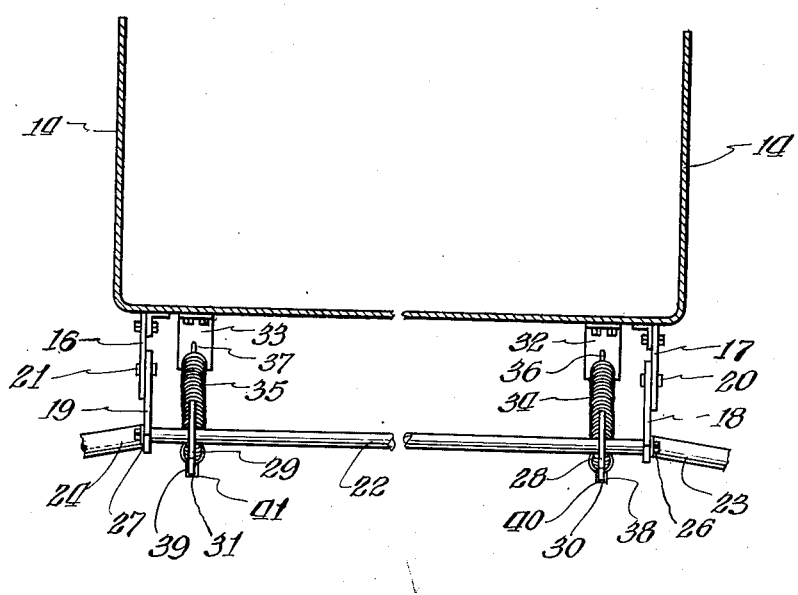
Fig. 2 is a sectional view taken on the line 2—2 of Fig. 1.

The reference numeral 10 indicates generally a harvester thresher having a supporting structure 11 with supporting wheels 12 only one of which is shown. The thresher or separator part is designated by the numeral 13 and a scoop shovel type of platform 14 is hingedly mounted at 15 at a relatively high point on the separator 13 above the ground wheels 12.

Bracket members 16 and 17 are fixedly attached to the under side of the platform 14 and depend downwardly therefrom. A first pair of arms 18 and 19 are hinged respectively to the brackets 16 and 17 at 20 and 21. A cross torque bar 22 joins the lower ends of the first pair of arms 18 and 19 and thus movement of one arm transmits corresponding and similar movement to the other arm. When the platform is in a down position as shown in full lines in Fig. 1, the pair of arms 18 and 19 are inclined forwardly and downwardly. When the platform is raised as shown in the dot-dash position of Fig. 1, the depending arms 18 and 19 are substantially vertically disposed.

A second pair of arms 23 and 24 are hinged to the supporting structure as shown at 25 at a location spaced beneath the platform hinge 15. The spacing of the hinge points for the second pair of arms at a position substantially below the platform hinge is an important factor in effecting raising and lowering of the platform. The second pair of arms 23 and 24 as shown in full lines in Fig. 1 are inclined forwardly and downwardly and are pivotally attached to the forwardly and downwardly extending first pair of arms at 26 and 27 respectively. The arms 18 and 23 are joined at the pivotal attachment 26 and the arms 19 and 24 are pivotally attached at 27. The angle of inclination of the first pair of arms and the second pair of arms is slightly different providing for their pivotal attachment one to the other at their forward intersection. When the platform is in its lower operating position the first pair of arms 18 and 19 and the second pair of arms 23 and 24 are jackknifed with respect to each other and thus constitute a substantially closed toggle linkage.

The cross bar 22 is equipped with spaced plate members 28 and 29 which are welded or otherwise fastened thereto at locations adjacent each of the pivotally attached arms. The plates 28 and 29 have cammed under surfaces 30 and 31 respectively. Bracket members 32 and 33 are fixed to the under side of the platform 14 adjacent the platform hinge 15 in spaced apart position comparable to the spacing of the plates 28 and 29 on the cross bar 22. Extension springs 34 and 35 are fastened at their upper ends to the brackets 32 and 33 at 36 and 37 which as previously stated are located adjacent the platform hinge 15 and thus a swinging movement of the platform about its hinge does not materially effect the change in length of the extension springs 34 and 35. Each of the springs 34 and 35 is equipped with a chain 38 and 39 respectively on its lower forward end. The chains are of a roller link type and are adapted to extend around and beneath the cammed under surfaces 30 and 31 of the plate members 28 and 29 and are fastened at their ends to the forward ends of the plates 28 and 29.

In operation the extension springs 34 and 35 are adapted to impart angular rotational movement to the cross rod or torque member 22. Thus there is a normal tendency for the toggle linkage to open. However, there is sufficient resistance to the extended springs 34 and 35 by reason of the jackknifed position of the first and second pair of arms so that the springs alone are incapable of raising the platform without external assistance. However, the springs are sufficiently strong so that upon an attempted raising of the platform the platform is entirely counter-balanced by the springs, making the platform raise and lower quite easily without any tendency to change positions after reaching its position of desired adjustment. As the platform is raised the extension springs 34 and 35 are shortened, thus decreasing the amount of pull or force that they might exert upon the raising of the platform. Simultaneously, as the platform raises, the angular opening between the toggle links increases thus providing for an increased mechanical advantage in the raising of the platform through the link arms. The cammed surfaces 30 and 31 are such that the effective length of the arm 18 is increased as the platform rises thus additionally compensating for the reduction in pulling power of the springs 34 and 35. The shape of the cams is necessarily a part of an oval wherein the short radius extends transversely of the arm 18 and the long radius thereof is in substantial longitudinal alignment with the arm 18. The linkage and the spring in combination with the cammed surfaces are arranged and constructed to cooperate with each other in such a manner that the sum of the mechanical forces urging the platform to an upwardly swung position remains constant throughout substantially the full range of movement of the platform.

With the counter-balancing mechanism of this invention applied to heavy platforms of harvester threshers, a single operator may raise and lower the platform without apparent effort. The platform may be vertically adjusted either by the operator directly lifting or lowering the platform or it may be operated by any suitable linkage from a location adjacent the operator's seat of the tractor for varying the height of cut of standing grain. The platform may also be elevated to a very high position for transport of the vehicle with the counter-balancing mechanism effectively holding it in elevated position. If it is desired any suitable form of locking means may be employed to aid in holding the platform in adjusted position.

Numerous details of construction may be varied throughout a wide range without departing from the principles disclosed herein and I therefore do not propose limiting the patent granted hereon otherwise than as necessitated by the appended claims.

What is claimed is:

1. In a platform supporting and counter-balancing mechanism comprising a supporting structure, a platform hinged on said supporting structure, a first arm hinged on the underside of said platform and normally disposed downwardly and forwardly toward the end of the platform opposite its hinge mounting, a second arm hinged at one end on said supporting structure at a location beneath the platform hinge and the arm extending forwardly and downwardly and having its forward end pivotally attached to the outer end of said first arm, counter-balancing extension spring means having one end attached to the pivotal attachment of the first and second arms, and the other end of said spring means fastened to a relatively fixed location adjacent the platform hinge.

2. In a platform supporting and counter-balancing mechanism comprising a supporting structure, a platform hinged on said supporting structure, a first arm hinged on the underside of said platform and angularly disposed away from said platform hinge, a second arm hinged at one end on said supporting structure at a location beneath the platform hinge and having its other end pivotally attached to the outer end of said first arm, whereby said first and second arms are substantially jackknifed, counter-balancing extension spring means having one end attached to the pivotal attachment of the first and second arms, and the other end of said spring means fastened to a relatively fixed location adjacent the platform hinge.

3. In a platform supporting and counter-balancing mechanism comprising a supporting structure, a platform hinged on said supporting structure, a first arm hinged on the underside of said platform and angularly disposed away from said platform hinge, a second arm hinged at one end on said supporting structure at a location beneath the platform hinge and having its other end pivotally attached to the outer end of said first arm, whereby said first and second arms are substantially jackknifed, a cam surface fixed to the lower end of said first arm, said cam surface comprising a portion of an oval and arranged so that the short radius thereof lies transversely to the first arm and the long radius thereof lies in longitudinal alignment with said first arm, counter-balancing extension spring means having one end attached to said cam surface and having the other end attached adjacent the platform hinge, whereby the spring means exerting a pulling force around the cam surface normally urges an open swinging of the jackknifed first and second arms, whereby the force required to raise the platform remains substantially constant throughout its full arcuate travel.

4. A device as set forth in claim 3 in which the upper end of the counter-balancing spring is attached to the underside of the hinged platform.

5. A platform supporting and counter-balancing mechanism comprising a supporting structure, a platform hinged on said supporting structure, a first pair of spaced arms hingedly mounted on the underside of said platform in spaced apart transversely aligned positions, a torque bar fastened to the lower free ends of said first pair of spaced arms, a second pair of spaced arms having one of their ends hingedly mounted on said supporting structure at spaced points and pivotally attached at their other ends to the outer ends of said first pair of arms, spaced plate members fastened to said torque bar and having cammed under surfaces, said cammed surfaces comprising portions of ovals wherein the small radius thereof is disposed transversely to the first pair of arms and the long radius thereof is disposed longitudinally of the first pair of arms, and spring means fastened at one end to the underside of the platform adjacent the platform hinge and at the other end to said spaced plates and arranged and constructed to urge rotation of said torque bar by acting about said cammed surfaces.

References Cited in the file of this patent

UNITED STATES PATENTS

| Number | Name | Date |
|---|---|---|
| 911,935 | Baumwart | Feb. 5, 1909 |
| 1,099,414 | Williams | June 9, 1914 |
| 1,272,845 | Peck et al. | July 16, 1918 |
| 1,726,667 | Hines | Sept. 3, 1929 |
| 1,748,746 | Zuckerman | Feb. 25, 1930 |
| 1,859,219 | Raney et al. | May 17, 1932 |
| 1,910,272 | Worthington | May 23, 1933 |
| 2,135,621 | Millard | Nov. 8, 1938 |
| 2,299,925 | Paradise et al. | Oct. 27, 1942 |
| 2,310,577 | Everett | Feb. 9, 1943 |
| 2,354,346 | MacGregor | July 25, 1944 |
| 2,375,848 | Hume | May 15, 1945 |
| 2,376,539 | Hitchcock et al. | May 22, 1945 |

FOREIGN PATENTS

| Number | Country | Date |
|---|---|---|
| 646,136 | Great Britain | Nov. 15, 1950 |